Figure 7:
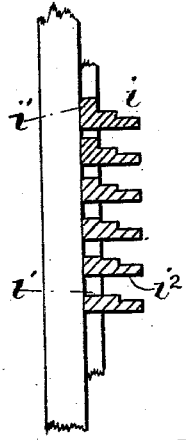

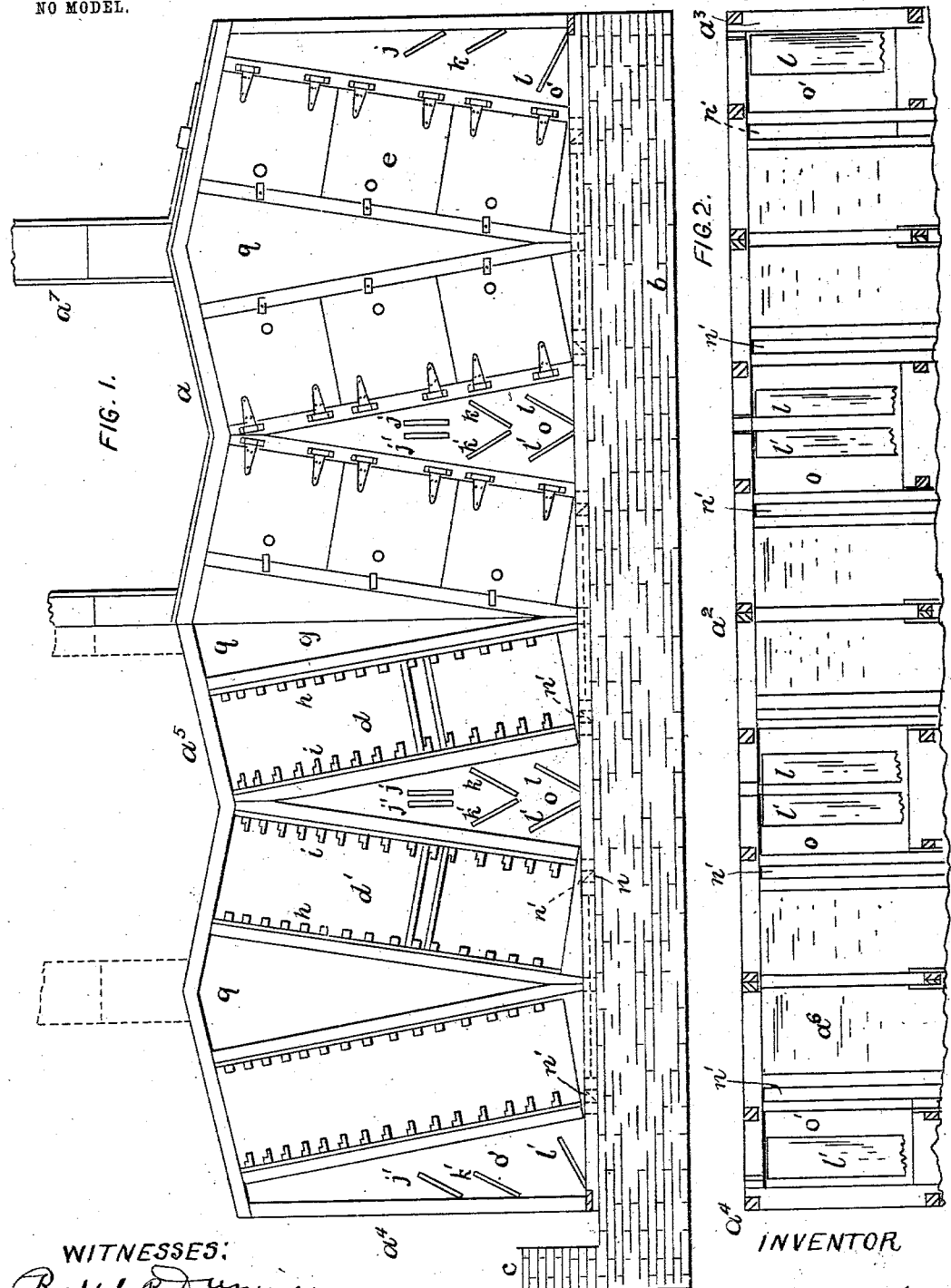

No. 740,588. PATENTED OCT. 6, 1903.
A. A. QUARNBERG.
FRUIT DRIER.
APPLICATION FILED MAY 18, 1899.
NO MODEL. 3 SHEETS—SHEET 2.
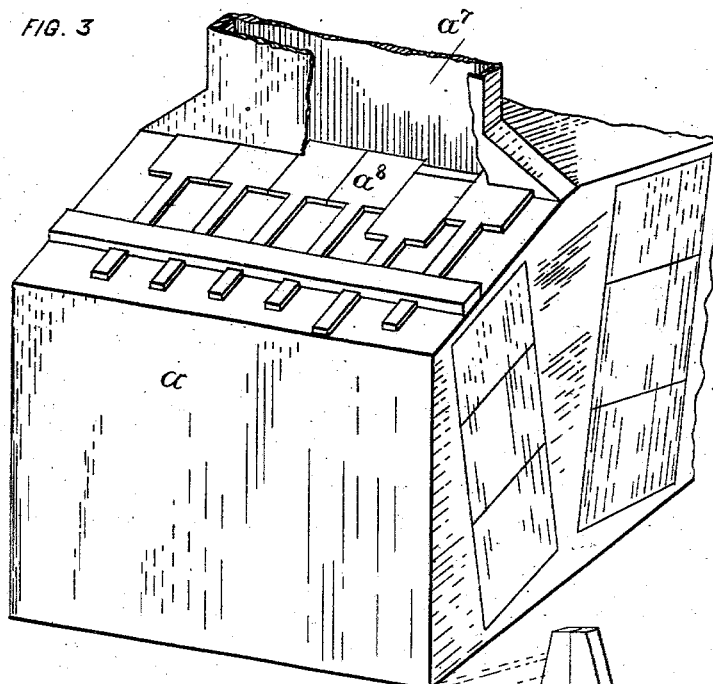
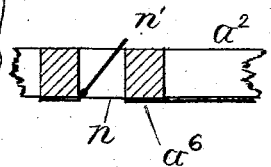
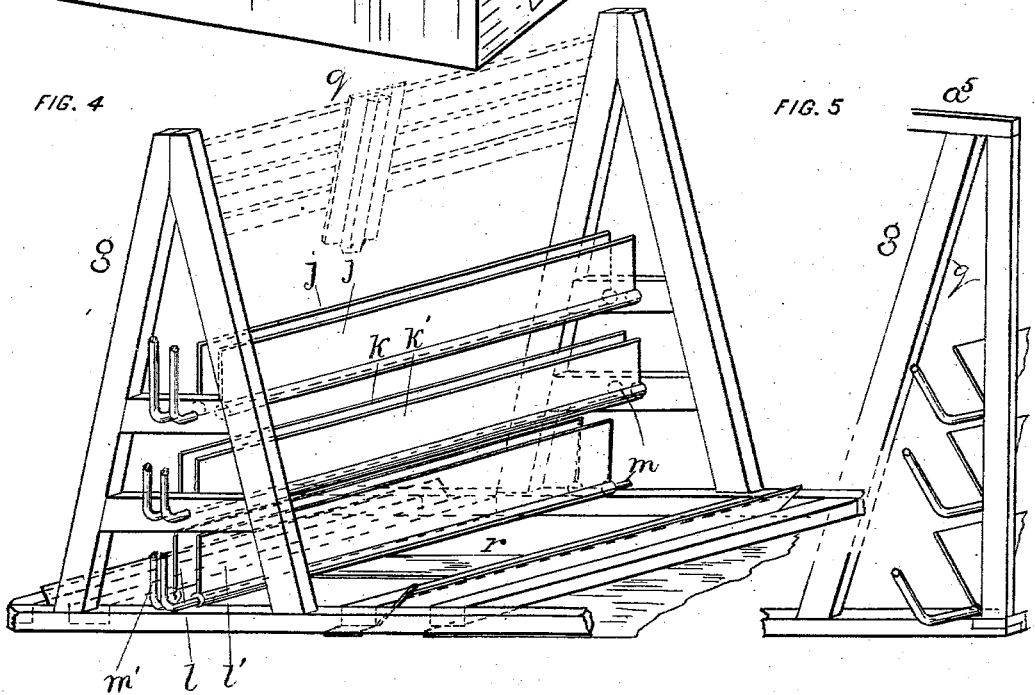
WITNESSES
INVENTOR
Andrew A. Quarnberg
BY
ATTORNEY No. 740,588. PATENTED OCT. 6, 1903.
A. A. QUARNBERG.
FRUIT DRIER.
APPLICATION FILED MAY 18, 1899.
NO MODEL. 3 SHEETS—SHEET 3.

WITNESSES
INVENTOR
Andrew A. Quarnberg
BY
ATTORNEY

No. 740,588. Patented October 6, 1903.

UNITED STATES PATENT OFFICE.

ANDREW A. QUARNBERG, OF VANCOUVER, WASHINGTON.

FRUIT-DRIER.

SPECIFICATION forming part of Letters Patent No. 740,588, dated October 6, 1903.

Application filed May 18, 1899. Serial No. 717,373. (No model.)

*To all whom it may concern:*

Be it known that I, ANDREW A. QUARNBERG, a citizen of the United States of America, and a resident of the city of Vancouver, county of Clarke, State of Washington, have invented certain new and useful Improvements in Fruit-Driers, of which the following is a specification.

My invention relates to fruit-driers, and especially to such as are intended for drying prunes.

The object of my invention is to obtain a drier which is of simple inexpensive structure, provided with all the means for promoting rapid and uniform drying of the fruit and the whole being compactly and conveniently arranged, so that a considerable quantity of fruit may be successfully handled.

The construction of my invention is fully illustrated in the drawings, in which—

Figure 8:
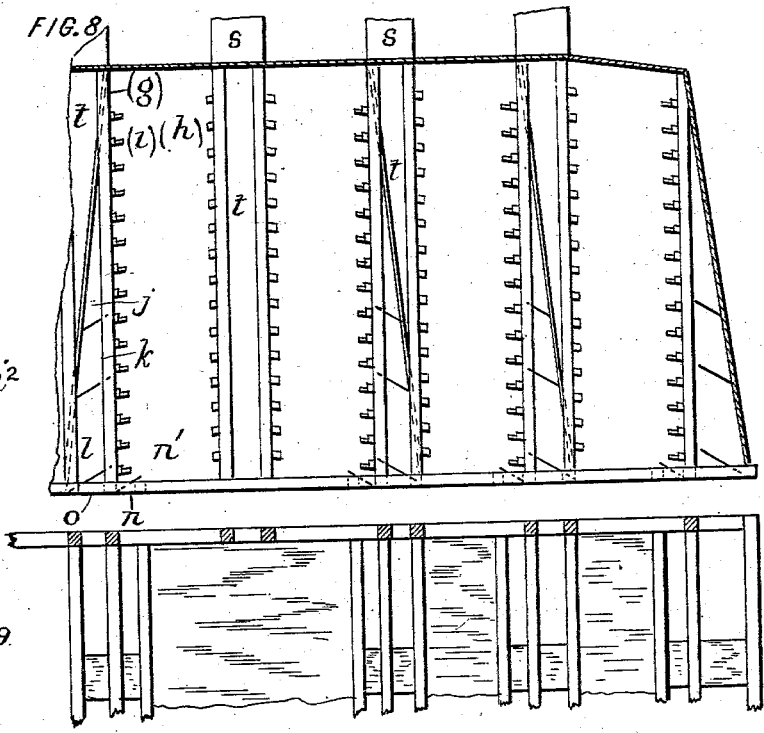
Figure 9:
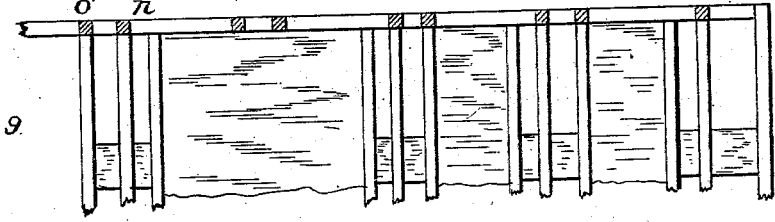
Figure 6:
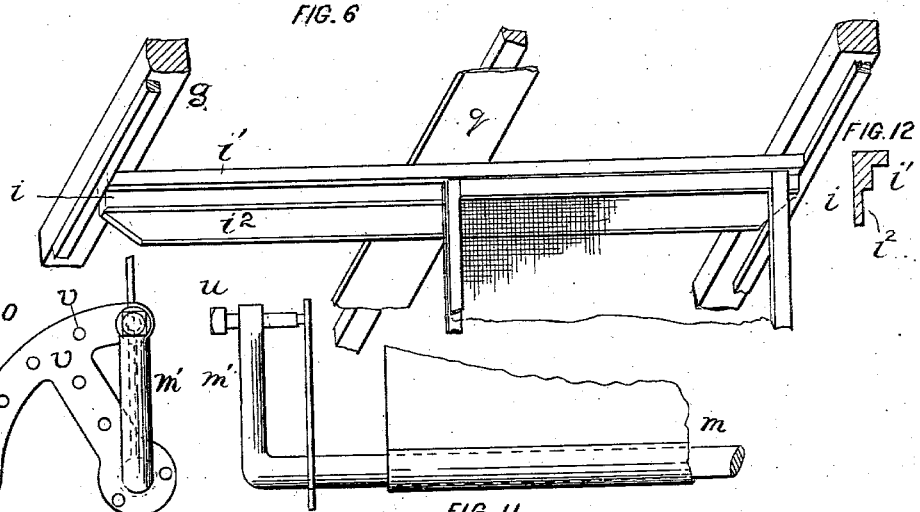
Figure 10:
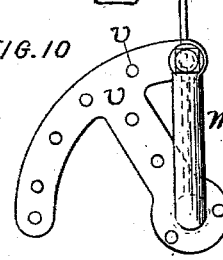
Figure 11:
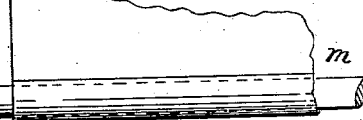

Figure 1 is an elevation of my drier, showing its outward appearance, the right half of the outer wall or casing being removed, so as to show the interior arrangement, and the outer wall closing the ends of the induction-passages has been likewise removed to show the deflectors $j\ j'\ k\ k'\ l\ l'$. Fig. 2 is a partial plan of the floor of my drier. Fig. 3 is a partial perspective end view of my drier. Fig. 4 is a perspective of the framework of the air-inlet passage, and this figure also in particular shows the construction of the means provided by me for deflecting the hot-air current for the purpose of throwing the same against some particular series of trays holding drying fruit to bring about uniform drying. Fig. 5 illustrates the application of similar heat-deflectors. In one of the ends are induction-passages. Fig. 6 is a partial cross-section of a side of one of the tray-holding or drying compartments. Fig. 7 is a partial vertical cross-section of the same part of such compartments. Fig. 8 is a partial elevation of a series of tray-holding or drying compartments differing in structure from those seen in Fig. 1 in this: that the upright timbers of the frame of the sides of such compartments are set perpendicular instead of leaning. The object of this modification in structure will be more fully explained in the body of the specification. Fig. 9 is a partial plan of the under side of the floor of the tray-holding or drying compartments illustrated in Fig. 8. Fig. 10 shows a front elevation of the handle $m'$ of one of the heat-deflectors ($m$, for example) and means for securing the handle and therewith the deflector in desired position. Fig. 11 is a partial side elevation of the same parts shown in Fig. 10. Fig. 12 is a cross-section of one of the slats $i$ on the hot-air-inlet side of the drying-compartment, this same figure also showing such slats as provided with the projecting shield $i^2$ and an enlarged back rail $i'$, the functions of which will be more fully explained in the body of the specification; and Fig. 13 is an enlarged longitudinal section of a portion of the floor in one of the drying-compartments, showing the opening $n$ in each floor communicating with the heating-chamber and a damper $n'$ in such opening controlling the same.

The letters designate the parts of my fruit-drier referred to in the description of its construction.

In its appearance my invention represents a box-like casing $a$, having greater length than width and mounted on a masonry foundation $b$, which should comprise a chamber for heating the air to be circulated through the drying-compartments and some suitable contrivance for generating the required heat. The details of construction of these apartments of my invention I did not deem necessary to illustrate in the drawings. The gaseous products of the furnace are carried off through a chimney $c$. Openings are provided in the heating-chamber for the admission of air from the outside. The interior of the casing is divided into a series of leaning rectangular transversely-extending drying-compartments, as $d\ d'$, the ends of which are entirely closed by doors $e$, comprising two or more sections each, and such doors being hinged in and forming a part of the walls of the casing and the side wall of such compartments being partly closed by the framework furnishing the supports for the fruit-trays, as shown in Fig. 1.

The skeleton structure of my drier is composed of a rectangular frame of groundsills $a^2\ a^3$, having cross-braces $a^6$, corner-posts $a^4$, intermediate post $g$, and rafters $a^5$. The rafters are covered by a roof and have air-flues $a^7$. The base of each flue is provided with a series of diaphragm valves or dampers $a^8$, whereby the openings through the roof into the flues may be partly or entirely closed. The posts $g$ may be made leaning or vertical. Preferring the former as best suited to accomplish the general plans of my invention, I will in the first place consider my invention as built with leaning posts $g$. Such posts constitute the corners of my drying-compartments, which are practically alike in construction. Affixed to the posts $g$ are a series of slats $h$ and $i$, extending horizontally crosswise. With the use of leaning posts the slats $h\ i$ may be so attached as to project at right angles, whereby the fruit-trays are given a slight incline sidewise for the purpose of promoting the circulation of the heated air between the trays. Each opposite pair of slats $h\ i$ constitute the supports for two fruit-trays. As already mentioned, the closure of the sides of the drying-compartments is effected by the slats $h\ i$. The intermediate spaces between the drying-compartments constitute induction ($o$) and eduction ($p$) passages for the hot air that is to be or has been circulated through the drying-compartments. The spaces in the bottom of the drying-compartments are closed with sheet-iron with the exception of small rectangular openings $n$, provided with dampers $n'$, a detail of which is shown in Fig. 13. The openings $n$ are provided to allow a limited supply of hot air to enter the base of the drying-compartment direct to insure the proper drying of the fruit in the lowest trays. The damper $n'$ should be hinged at the bottom of the sills, so as not to obstruct the entrance of the hot air beneath the lowest trays from the induction-passages $o$. The damper $n'$ should be adjusted, of course, to admit only the required amount of hot air through $n$. The arrangement of the slats $i$ on that side of the compartment through which the hot air is admitted to the fruit-trays is one of the essential points to be observed in the construction of my invention. As will be seen from Figs. 1 and 7, the heated air is admitted between the trays through the rectangular openings left between such slats. The size of the slats $i$, closing the upper half or portion of the compartments, is graduated—that is to say, the slats as they reach the upper part of the compartment are provided with flange-backs $i$, (see Fig. 12,) increasing in size toward the uppermost slats progressively. This arrangement is well illustrated in Fig. 7. The object thereof is to gradually diminish the size of the rectangular openings admitting the heated air to the fruit-trays to retard the escape of air into the drying-compartments from the upper part of the induction-passage $o$, where the hot air will try to escape first, and making the largest openings from such induction-passages lower down to facilitate the escape of the hot air retarded in its upward progress into the lower part of such compartments. The construction of the air-induction passages, tapering the walls thereof toward the top and reducing the air-space, also helps to retard the admission of the heated air into the upper part of the drying-compartment. The arrangement of the trays so as to be supported crosswise in my drier is very convenient. Two trays are supported in each tier and access had to each by opening the proper section of the doors $e$ on either side. To further control the travel of the hot air, I employ a series of heat-deflectors $j\ j'\ k\ k'\ l\ l'$, each being a wing attached to an axle $m$, having a handle $m'$, as shown in Figs. 4, 10, and 11. The adjustment of either of said deflectors is thus controllable, and each thereof may be so set as to direct the hot air evenly throughout the entire tiers of trays in a drying-compartment, being assisted in this respect by the graduation of the openings from the induction-passages $o$ and by the flues $a^7$ and the dampers $a^8$ therein provided. The circulation of the heated air through the drying-compartments is induced by means of said flues $a^7$, through which it escapes rapidly or slowly, according to the adjustment of the dampers $a^8$. The said dampers may be used for two purposes: for controlling the escape of the heated air—as, for example, by partly closing the entire series of dampers in a flue—or for forcing the current of hot air to pass through the tiers of trays in uniform strata, reaching all parts of the trays from end to end and guarding against the fruit on any particular part of the trays drying faster than the remainder. This is done by opening one of the dampers more than the rest, whereby lack of uniformity in the air-current can be overcome. The slats $i$ are also respectively provided with shields $i^2$ for the purpose of protecting the fruit lying nearest that edge of the tray which is first reached by the hot air admitted into the compartments. I have found by experience that quite frequently the fruit so disposed dries long before the remaining fruit on the tray has been sufficiently dried. By the use of the shields which I have just described the fruit so exposed is protected. The details of construction of such slats $i$, provided with said shields $i^2$, are shown in Figs. 6 and 7 especially.

The central shields $g$, affixed to the slats $h\ i$ on both sides of the drying-compartments, are provided to protect the inner ends of the trays lying in the central part of the drying-compartment against a direct current of hot air. These shields obstruct the free circulation of the hot air, which is very necessary, for the temperature usually rises more rapidly and the drying process is more rapid in the center of the compartments. There is also always a tendency for the fruit lying nearest the frame of the screens, especially in the corners thereof, to dry more rapidly than the fruit on the other parts of the trays. This is probably due to the fact that the inherent moisture of the fruit affects the temperature of the hot air coming in contact with it and reduces the same, while the frames of the trays being dry do not so affect the temperature. To overcome this uneven drying is one of the objects of the shields $i^2$, and the shields $q$ and the shields $r$, extending longitudinally across the central part of the mouth of the induction-passages, (see Fig. 4,) serve a like purpose, protecting the inner ends of the trays against direct ascending currents of hot air.

The construction described of my drier is carried out from end to end, only that at the ends the induction-passages $o'$ have but a single series of heat-deflectors $j$ $k$ $l$ or $j'$ $k'$ $l'$.

When wishing to cut out a section of two drying-compartments from the rest of the drier, it is but necessary to turn down the deflectors $l$ $l'$ and close the dampers $n'$ and also the dampers $a^8$ of such section. To cut out the ends, substantially the same means are resorted to.

In Figs. 8 and 9 a modification is introduced. At the same time the general plan of construction of my invention is still carried out. The difference consists in the use of perpendicular posts $g$, on which are affixed slats, like $h$ $i$; but instead of inclining the drying-compartments and by so doing obtaining tapering air-induction passages and flaring air-eduction passages, with the resulting benefits above set forth, the air-shafts $s$, (extending into flues, like $a^7$, and to be provided with dampers, as $a^8$, which appurtenances I omitted for lack of space on the drawing-sheet,) are perpendicular, and with the exception of the center shaft of the drier, to be used exclusively as an eduction-passage, have diagonal partitions $t$, dividing the lower half of such shaft into an induction-passage, and the upper half into an eduction-passage for the hot-air currents. With perpendicular posts $g$ the slats $h$ $i$ must be slightly slanted and one of the two slats supporting trays set a little above the other to give the trays the desirable incline. In other respects there is no difference in this modification.

In Figs. 10 and 11 I have shown means for securing the heat-deflectors at a proper incline. The contrivance seen represents a set-screw $u$ in the extremity of the handle $m'$, the end of which set-screw may be inserted in a perforation $u'$ in the plate $u$, attached to the exterior of the housing in proper place. When the proper adjustment of the heat-deflectors $j$ $j'$ $k$ $k'$ has once been ascertained, they may be fixed in such position.

When properly regulated, my invention will insure the rapid and uniform drying of the fruit in each individual tray and throughout the drying-compartments without danger of scorching or molding and with but little watching.

The heat-deflectors, like $j$ $j'$ $k$ $k'$ $l$ $l'$, which I make use of must be distinguished from mere dampers, because the functions of my deflectors is not to intercept the hot-air current, not to interrupt or cut up such current, but merely to divert or deflect the same toward the particular portion of the trays in the drying-compartments.

Now what I claim is—

1. In a fruit-drier comprising a heating, or furnace chamber, and a superstructure, or inclosure, built thereon, the combination of a series of transversely and parallelly extending compartments; intermediate alternating wedge-shaped hot-air induction and eduction passages communicating with said drying-compartments, the former of such passages communicating with the heating-chamber, and the latter with a flue in the roof of the drier; dampers for controlling the admission of the hot-air inlets and outlets of said hot-air passages, and a series of heat-deflectors in the induction-passages, substantially as described.

2. In a fruit-drier, comprising a heating or furnace chamber, and a superstructure or inclosure built thereon, the combination of a series of transversely and parallelly extending drying-compartments, and intermediate alternating wedge-shaped hot-air induction and eduction passages, the said passages communicating with the said compartments, and the former thereof communicating with the heating-chamber, and the latter with a flue in the roof of the drier; means for controlling the draft through the eduction-passages; a partial closure for the bottom of each of the drying-compartments leaving openings $n$; dampers controlling such openings; and a series of heat-deflectors in the induction-passages, substantially as described.

3. In a fruit-drier, in combination, a heating or furnace chamber; a superstructure or inclosure built on such chamber, comprising a series of posts constituting the corners of a series of transversely-extending drying-compartments; the horizontal slats or rails $h$, $i$, affixed to said posts, providing supports for the fruit-trays, and the closure of the sides of said compartments, leaving spaces between the tray tiers; doors closing the ends of such compartments; the wedge-shaped hot-air alternating induction and eduction passages between the drying-compartments; the former communicating with the heating-chamber, and the latter with a flue in the roof; means for controlling the draft through the eduction-passages; a partial closure for the floor of each of the drying-compartments, leaving openings $n$; the dampers controlling such openings; and a series of heat-deflectors in the induction-passages, substantially as described.

4. In a fruit-drier, in combination, a heating or furnace chamber; a superstructure or inclosure built on such chamber, comprising a series of posts constituting the corners of a series of transversely-extending drying-compartments; the horizontal slats or rails $h$, $i$, affixed to said posts, providing supports for the fruit-trays, and the closure of the sides of said compartments, leaving spaces between the tray tiers; doors closing the ends of such compartments; the wedge-shaped hot-air alternating induction and eduction passages between the drying-compartments; the former communicating with the heating-chamber, and the latter with a flue in the roof; means for controlling the draft through the eduction-passages; the shields $i^2$ projecting from the slats $i$ on the inlet side of the drying-compartments; a partial closure for the floor of each of the drying-compartments, leaving openings $n$; the dampers controlling such openings; and a series of heat-deflectors in the induction-passages, substantially as described.

5. In a fruit-drier, in combination, a heating or furnace chamber; a superstructure or inclosure built on such chamber, comprising a series of posts constituting the corners of a series of transversely-extending drying-compartments; the horizontal slats or rails $h$, $i$, affixed to said posts, providing supports for the fruit-trays, and the closure of the sides of said compartments, leaving spaces between the tray tiers; doors closing the ends of such compartments; the wedge-shaped hot-air alternating induction and eduction passages between the drying-compartments; the former communicating with the heating-chamber, and the latter with a flue in the roof; means for controlling the draft through the eduction-passages; the shields $i^2$ projecting from the slats $i$ on the inlet side of the drying-compartments; the backs of the slats $i$ along the upper half of the inlet side of the drying-compartment being graduated in height, so as to gradually diminish, progressively, the rectangular openings between the said slats; a partial closure for the floor of each of the drying-compartments, leaving openings $n$; the dampers controlling such openings; and a series of heat-deflectors in the induction-passages, substantially as described.

6. In a fruit-drier, in combination, a heating or furnace chamber; a superstructure or inclosure built on such chamber, comprising a series of posts constituting the corners of a series of transversely-extending drying-compartments; the horizontal slats or rails $h$, $i$, affixed to said posts, providing supports for the fruit-trays, and the closure of the sides of said compartments, leaving spaces between the tray tiers; doors closing the ends of such compartments; the wedge-shaped hot-air alternating induction and eduction passages between the drying-compartments; the former communicating with the heating-chamber, and the latter with a flue in the roof; means for controlling the draft through the eduction-passages; the shields $i^2$ projecting from the slats $i$ on the inlet side of the drying-compartments; the backs of the slats $i$ along the upper half of the inlet side of the drying-compartment being graduated in height, so as to gradually diminish, progressively, the rectangular openings between the said slats; the centrally-positioned shields $q$ on both sides of each of the respective compartments; a partial closure for the floor of each of the drying-compartments, leaving openings $n$; the dampers controlling such openings; and a series of heat-deflectors in the induction-passages, substantially as described.

7. In a fruit-drier, comprising a heating or furnace chamber, and a superstructure or inclosure built thereon, the combination of a series of transversely and parallelly extending drying-compartments, and intermediate alternating wedge-shaped hot-air induction and eduction passages, the said passages communicating with the said compartments, and the former thereof communicating with the heating-chamber, and the latter with a flue in the roof of the drier; means for controlling the draft through the eduction-passages; a partial closure for the bottom of each of the drying-compartments leaving openings $n$; the shields $r$ extending longitudinally across the central part of the mouth of the induction-passages; dampers controlling such openings; and a series of heat-deflectors in the induction-passages, substantially as described.

8. In a fruit-drier, in combination, a heating or furnace chamber; a superstructure or inclosure built on such chamber, comprising a series of posts constituting the corners of a series of transversely-extending drying-compartments; the horizontal slats or rails $h$, $i$, affixed to said posts, providing supports for the fruit-trays, and the closure of the sides of said compartments, leaving spaces between the tray tiers; doors closing the ends of such compartments; the wedge-shaped hot-air alternating induction and eduction passages between the drying-compartments; the former communicating with the heating-chamber, and the latter with a flue in the roof; the independently-adjustable damper-sections $a^8$ controlling said flues; the shields $i^2$ projecting from the slats $i$ on the inlet side of the drying-compartments; the backs of the slats $i$ along the upper half of the inlet side of the drying-compartments being graduated in height, so as to gradually diminish, progressively, the rectangular openings between the said slats; the centrally-positioned shields $q$ on both sides of each of the respective compartments; a partial closure for the floor of each of the drying-compartments, leaving openings $n$; the shields $r$ extending longitudinally across the central part of the mouth of the induction-passages; the dampers controlling such openings; and a series of heat-deflectors in the induction-passages, substantially as described.

In testimony whereof I have hereunto affixed my signature in the presence of two witnesses.

ANDREW A. QUARNBERG.

Witnesses:
ROBT. ROBINSON,
T. J. GEISLER.